US011048498B2

(12) United States Patent
Malladi et al.

(10) Patent No.: US 11,048,498 B2
(45) Date of Patent: Jun. 29, 2021

(54) EDGE COMPUTING PLATFORM

(71) Applicant: FogHorn Systems, Inc., Sunnyvale, CA (US)

(72) Inventors: Sastry K M Malladi, Fremont, CA (US); Thirumalai Muppur Ravi, Portola Valley, CA (US); Mohan Komalla Reddy, Fremont, CA (US); Kamesh Raghavendra, Bangalore (IN)

(73) Assignee: FogHorn Systems, Inc., Sunnyvale, CA (US)

( * ) Notice: Subject to any disclaimer, the term of this patent is extended or adjusted under 35 U.S.C. 154(b) by 0 days.

(21) Appl. No.: 16/539,968

(22) Filed: Aug. 13, 2019

(65) Prior Publication Data

US 2019/0369984 A1 Dec. 5, 2019

Related U.S. Application Data

(60) Division of application No. 16/013,853, filed on Jun. 20, 2018, now Pat. No. 10,379,842, which is a
(Continued)

(51) Int. Cl.
*G06F 8/70* (2018.01)
*H04L 12/28* (2006.01)
(Continued)

(52) U.S. Cl.
CPC .............. *G06F 8/70* (2013.01); *G05B 15/02* (2013.01); *G06F 9/542* (2013.01); *H04L 12/283* (2013.01);
(Continued)

(58) Field of Classification Search
None
See application file for complete search history.

(56) References Cited

U.S. PATENT DOCUMENTS 8,572,155 B2 10/2013 Yanovich et al.
9,721,210 B1* 8/2017 Brown .................. G06N 20/00
(Continued)

FOREIGN PATENT DOCUMENTS

| CN | 101860978 | 10/2010 |
| CN | 103024059 | 4/2013 |
| CN | 103200249 | 7/2013 |

OTHER PUBLICATIONS

Mohammad Aazam, Eui-Nam Huh, Fog Computing and Smart Gateway Based Communication for Cloud of Things, 2014 International Conference on Future Internet of Things and Cloud, Aug. 31, 2014, pp. 464-470, IEEE, https://pdfs.semanticscholar.org/aa8a/6894735dc32aa7212ab7606ccd6d6e7338b9.pdf.
(Continued)

*Primary Examiner* — Daxin Wu
(74) *Attorney, Agent, or Firm* — Aka Chan LLP

(57) ABSTRACT

A method for enabling intelligence at the edge. Features include: triggering by sensor data in a software layer hosted on either a gateway device or an embedded system. Software layer is connected to a local-area network. A repository of services, applications, and data processing engines is made accessible by the software layer. Matching the sensor data with semantic descriptions of occurrence of specific conditions through an expression language made available by the software layer. Automatic discovery of pattern events by continuously executing expressions. Intelligently composing services and applications across the gateway device and embedded systems across the network managed by the software layer for chaining applications and analytics expressions. Optimizing the layout of the applications and analytics based on resource availability. Monitoring the health of the software layer. Storing of raw sensor data or results of expressions in a local time-series database or cloud
(Continued)

storage. Services and components can be containerized to ensure smooth running in any gateway environment.

40 Claims, 6 Drawing Sheets

Related U.S. Application Data continuation of application No. 15/250,720, filed on Aug. 29, 2016, now Pat. No. 10,007,513.

(60) Provisional application No. 62/210,981, filed on Aug. 27, 2015.

(51) Int. Cl.
*G06F 9/54* (2006.01)
*H04L 29/08* (2006.01)
*G05B 15/02* (2006.01)

(52) U.S. Cl.
CPC .......... *H04L 12/2823* (2013.01); *H04L 29/08* (2013.01); *H04L 67/12* (2013.01); *H04L 67/2804* (2013.01)

(56) References Cited

U.S. PATENT DOCUMENTS

| | | |
|---|---|---|
| 9,843,647 B2 | 12/2017 | Stenneth |
| 2004/0002838 A1 | 1/2004 | Oliver et al. |
| 2006/0094443 A1 | 5/2006 | Dowling et al. |
| 2009/0055126 A1 | 2/2009 | Yanovich et al. |
| 2009/0113049 A1 | 4/2009 | Nasle et al. |
| 2009/0228407 A1 | 9/2009 | Ramesh et al. |
| 2014/0047107 A1 | 2/2014 | Maturana et al. |
| 2014/0359552 A1 | 12/2014 | Misra et al. |
| 2015/0067791 A1 | 3/2015 | Matus |
| 2015/0161214 A1 | 6/2015 | Kali et al. |
| 2015/0213056 A1 | 7/2015 | Maluf et al. |
| 2015/0244826 A1* | 8/2015 | Stenneth ............... H04L 67/322 709/213 |
| 2015/0312125 A1* | 10/2015 | Subramanian .......... H04L 65/80 709/224 |
| 2015/0371465 A1 | 12/2015 | Garrett et al. |
| 2016/0065306 A1 | 3/2016 | Huang et al. |
| 2016/0146617 A1 | 5/2016 | Macfarlane |
| 2016/0217387 A1* | 7/2016 | Okanohara ............ G06N 20/00 |
| 2016/0217388 A1* | 7/2016 | Okanohara ............ G06N 20/00 |
| 2016/0247089 A1 | 8/2016 | Zhao et al. |
| 2016/0371316 A1* | 12/2016 | Okanohara ............ G06N 7/005 |
| 2017/0011298 A1 | 1/2017 | Pal et al. |

OTHER PUBLICATIONS

International Search Report, PCT Application PCT/US2016/049316, dated Dec. 13, 2016, 5 pages.
European Patent Office, Extended European Search Report, EP Application No. 16840261.8, dated Feb. 13, 2019, 8 pages.

\* cited by examiner

EDGE COMPUTING PLATFORM

CROSS-REFERENCE TO RELATED APPLICATIONS

This patent application is a divisional of U.S. patent application Ser. No. 16/013,853, filed Jun. 20, 2018, issued as U.S. Pat. No. 10,379,842 on Aug. 13, 2019, which is a continuation of U.S. patent application Ser. No. 15/250,720, filed Aug. 29, 2016, issued as U.S. Pat. No. 10,007,513 on Jun. 26, 2018, which claims the benefit of U.S. patent application 62/210,981, filed Aug. 27, 2015. These applications are incorporated by reference along with all other references cited in this application. U.S. patent applications 62/312,106, 62/312,187, 62/312,223, and 62/312,255, filed Mar. 23, 2016, are incorporated by reference.

BACKGROUND OF THE INVENTION

The invention relates to the field of computing, and more specifically to edge computing to handle the large amounts of data generated by industrial machines.

Traditional enterprise software application hosting has relied on datacenter or "cloud" infrastructure to exploit economies of scale and system efficiencies. However, these datacenters can be arbitrarily distant from the points of physical operations (e.g., factories, warehouses, retail stores, and others), where the enterprise conducts most of its business operations. The industrial Internet of things (IIoT) refers to a collection of devices or use-cases that relies on instrumentation of the physical operations with sensors that track events with very high frequency.

Industrial machines in many sectors com under this Internet of things (IoT) including manufacturing, oil and gas, mining, transportation, power and water, renewable energy, heath care, retail, smart buildings, smart cities, and connected vehicles. Despite the success of cloud computing, there are number of shortcomings: It is not practical to send all of that data to cloud storage because connectivity may not always be there, bandwidth is not enough, or it is cost prohibitive even if bandwidth exists. Even if connectivity, bandwidth, and cost are not issues, there is no real-time decision making and predictive maintenance that can result in significant damage to the machines.

Therefore, improved computing systems, architectures, and techniques including improved edge analytics are needed to handle the large amounts of data generated by industrial machines.

BRIEF SUMMARY OF THE INVENTION

A method for enabling intelligence at the edge. Features include: triggering by sensor data in a software layer hosted on either a gateway device or an embedded system. Software layer is connected to a local-area network. A repository of services, applications, and data processing engines is made accessible by the software layer. Matching the sensor data with semantic descriptions of occurrence of specific conditions through an expression language made available by the software layer. Automatic discovery of pattern events by continuously executing expressions. Intelligently composing services and applications across the gateway device and embedded systems across the network managed by the software layer for chaining applications and analytics expressions. Optimizing the layout of the applications and analytics based on resource availability. Monitoring the health of the software layer. Storing of raw sensor data or results of expressions in a local time-series database or cloud storage. Services and components can be containerized to ensure smooth running in any gateway environment.

Edge intelligence is enabled at the source of the Internet of things (IoT) data. A system provides enriched access (stream or batch modes, or both) to IoT device sensor data for real-time edge analytics and applications. The system includes a highly efficient and expressive computer language for executing analytical functions and expressions, through a high performance analytics engine that operates in low memory footprint machines. The system allows publishing of aggregate data to cloud to further machine learning. The system includes a software development kit for developing edge apps. A cloud-based management console allows managing of edge deployments, configuration, applications, and analytics expressions.

A specific implementation of an edge infrastructure and platform is by FogHorn Systems, Inc. (FogHorn). The FogHorn Web site, www.foghorn-systems.com, publications (including white papers, user guides, tutorials, videos, and others), and other publications about FogHorn technology and products are incorporated by reference.

FogHorn provides a platform to enable edge intelligence for industrial and commercial internet of things (IoT) data. The amount of data generated by tens of billions of industrial and commercial IoT devices will be massive enough to overwhelm the entire Internet. The FogHorn platform processes, analyzes, and responds to IoT data right where it originates—at the edge of the network. FogHorn's "intelligent edge" software platform enables unprecedented levels of automation, operational efficiency, cost savings, and much more.

The Industrial Internet of Things (IIoT) consists of interconnected industrial and commercial devices such as sensors, machinery, and computers. The goal of IIoT is to enable greater device control, data management, machine automation, and operational efficiency across a distributed enterprise. Companies can apply fog computing at the edge to capture greenfield IIoT opportunities using real-time analytics and automated responses while also leveraging cloud computing for system-wide management and optimization. FogHorn edge computing platform is also designed to run in existing programmable logic controllers (PLCs) (e.g., Brownfield opportunities) if adding additional computing resources is not viable. Brownfield refers to an implementation of new systems to resolve information technology (IT) problem areas while accounting for established systems. New software architecture takes into account existing and running software.

Edge intelligence platform is a software-based solution based on fog computing concepts which extends data processing and analytics closer to the edge where the IIoT devices reside. Maintaining close proximity to the edge devices rather than sending all data to a distant centralized cloud, minimizes latency allowing for maximum performance, faster response times, and more effective maintenance and operational strategies. It also significantly reduces overall bandwidth requirements and the cost of managing widely distributed networks.

Focusing on IIoT operations at the edge reduces overall bandwidth requirements and enables immediate automated responses to time-sensitive conditions. The industrial world is adding billions of new IIoT devices and collectively these devices generate many petabytes of data each day. Sending all of this data to the cloud is not only very cost prohibitive but it also creates a greater security risk. Operating at the edge ensures much faster response times, reduced risks, and lower overall costs.

In an implementation, an edge computing platform system includes: a number of sensor data streams, and a software layer physically disposed between the sensors and a communication network, the software layer being configured to perform computations based on raw data received from the sensors. The software layer can include a programmable virtual sensor from a viewpoint of the data processing layer and communication network.

The software can include a data processing layer including a complex event processing engine and an expression language for stream processing. The data processing layer can include a data enrichment layer and a software development kit to interact with and develop applications. The software can include a data publication layer to publish the sensor data streams or derived data or metadata from the expressions in at least one of a local time-series database or a cloud storage provider of choice.

The system can include an application repository, where the software layer is configured to store, retrieve, and deploy applications from the application repository. The applications are configured for processing of sensor data on the hardware layer. The application repository is configured to customize an application container based on resources available on the hardware layer.

In an implementation, a sensor system includes: a number of sensors; and a hardware layer physically disposed between the sensors and a communication network, the hardware layer being configured to perform computations based on raw data received from the sensors. The hardware layer can be configured to be programmable as a virtual sensor from a viewpoint of the communication network. The virtual sensor can include an application program interface (API) specified by programming in the hardware layer.

The system can include an application repository, where the hardware layer is configured to receive applications from the application repository. The applications being configured for processing of sensor data on the hardware layer. The application repository being configured to customize an application container based on resources available on the hardware layer.

In an implementation, a method includes: receiving a sensor data stream data over a first network connection type at a data ingestion agent of an edge platform system; from the data ingestion agent, delivering ingested stream data to a data bus of the system; processing the ingested stream data at an analytics engine that is connected to (e.g., subscribing to data from) the data bus where the processing includes executing analytic expressions provided in an expression language to generate intelligence information from the ingested stream data; and publishing the intelligence information on the data bus. The method can include: enriching the ingested data in real time through a data enrichment component and making the ingested data available on the data bus. Enrichment can include, but is not limited to, data decoding, metadata decoration, data normalization, and the like.

The method can include: receiving the intelligence information from the data bus at a data publisher component; and by way of the data publisher component, storing the intelligence information in a time-series database. Also, the method can include by way of the data publisher component, transferring at least a portion of the intelligence information over a second network connection type and storing in a cloud storage, where the second network connection type is different from the first network connection type, and the second network connection type has a lower bandwidth connection than the first network connection type to the sensor data stream data.

For example, the first network connection type can use industrial IOT protocols such as MQTT, OPC Unified Architecture, or Modbus protocol, as well as custom protocols. The second network connection type can use an Internet protocol such as TCP/IP, Hypertext Transfer Protocol (HTTP), WebSockets, WebHDFS, or Apache Kafka, or any combination of these. The second network connection type can also use protocols described above for the first network connection type.

The data ingestion agent can access the sensor data stream data over a first network connection type via a push protocol. The data ingestion agent can access the sensor data stream data over a first network connection type via a pull protocol.

The method can include: providing a software development kit that is allows a user to develop application for the edge platform system; and by way of the software development kit, developing a first containerized application that can access and process the intelligence information available on the data bus. The method can include: receiving the intelligence information from the data bus at a data publisher component; by way of the data publisher component, storing the intelligence information in a time-series database; and by way of the software development kit, developing a second containerized application that can access and process the intelligence information stored in the time-series database.

The method can include: providing an application store of the edge platform system, where the first and second containerized applications are available for other users to access through the application store.

The first containerized application is executable within the edge platform system where first containerized application has a direct connection to the data bus. The first containerized application (without changes) is also executable in a cloud environment, where first containerized application does not have a direct connection to the data bus but accesses the intelligence information via the second network connection type.

The method can include: using the expression language, creating a first virtual sensor having a first input connected to a first physical sensor and a first output that is a first function of the first input. The first function is specified in the expression language. The first virtual sensor receives first stream data from the first physical sensor. At the first output, the first virtual sensor outputs second stream data that is the first stream data operated on according to the first function. The intelligence information includes the second stream data.

The method can include: using the expression language, creating a first virtual sensor having a first input connected to a first physical sensor, a second input connected to a second physical sensor, and a first output that is a first function of the first and second inputs. The first function is specified in the expression language. The first virtual sensor receives first stream data from the first physical sensor and second stream data from the second physical sensor. At the first output, the first virtual sensor outputs third stream data that is the first and second stream data operated on according to the first function. The intelligence information includes the third stream data.

In an implementation, a method includes: receiving a sensor data stream data over a first network connection type at a data ingestion agent of an edge platform system; from the data ingestion agent, delivering ingested stream data to a data bus of the system; processing the ingested stream data at an analytics engine that is connected to the data bus where the processing includes executing analytic expressions provided in an expression language to generate intelligence information from the ingested stream data; and providing a first virtual sensor having an input connected to a first physical sensor and an output that is a first function of the input, where the first function is specified in the expression language, the first virtual sensor receives first stream data from the first physical sensor, and at the output, the first virtual sensor outputs second stream data that is the first stream data operated on according to the first function, and the intelligence information includes the second stream data.

The method further includes: providing a second virtual sensor having a first input connected to a second physical sensor, a second input connected to the output of the first virtual sensor, and an output that is a second function of the first and second inputs, where the second function is specified in the expression language, the second virtual sensor receives third stream data from the second physical sensor and the second stream data from the first virtual sensor, and at the first output, the second virtual sensor outputs fourth stream data that is the second and third stream data operated on according to the second function, and the intelligence information includes the fourth stream data; publishing the intelligence information on the data bus; receiving the intelligence information from the data bus at a data publisher component; and by way of the data publisher component, storing the intelligence information in a time-series database.

In an implementation, a method includes: specifying a first virtual sensor in an expression language of a edge platform, where the first virtual sensor includes an output that is a first function of an input, where the first input is connected to a first stream of a first physical sensor, and the first virtual sensor outputs a second stream; and allowing specifying of a second virtual sensor in the expression language, where the second virtual sensor includes an output that is a second function of a first and second input, where the first input is connected to a second stream of a second physical sensor and the second input is connected to second stream from the first virtual sensor.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
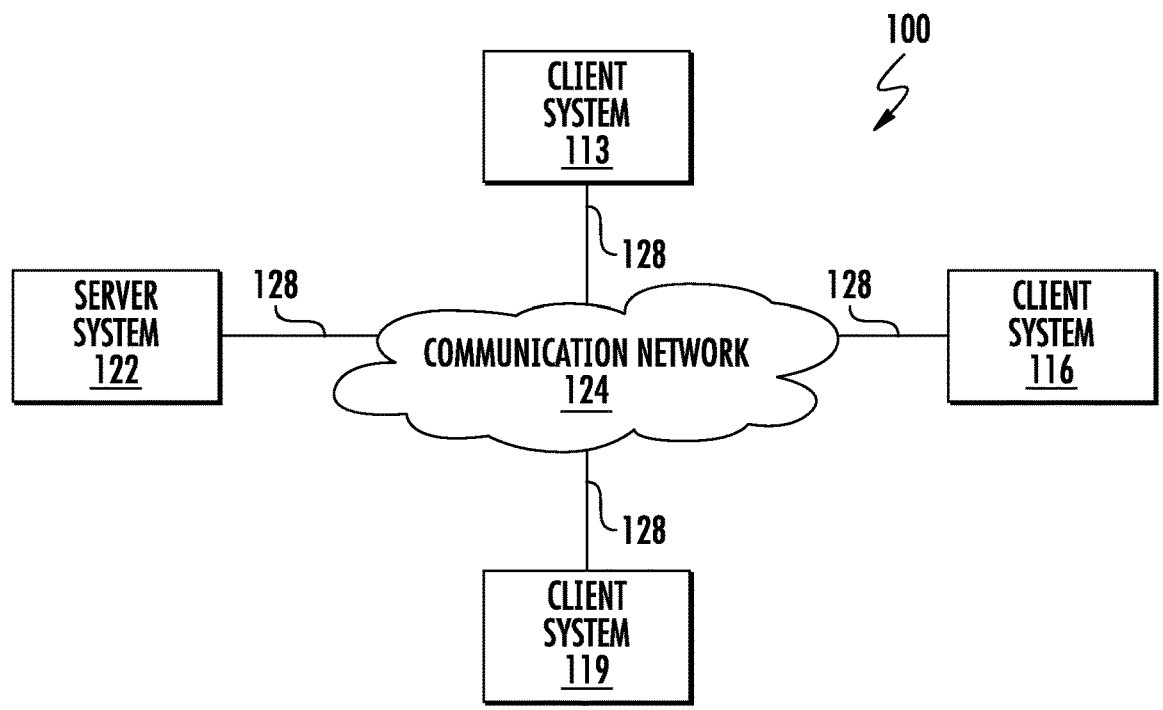
FIG. 1 shows a block diagram of a client-server system and network.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a standalone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a standalone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
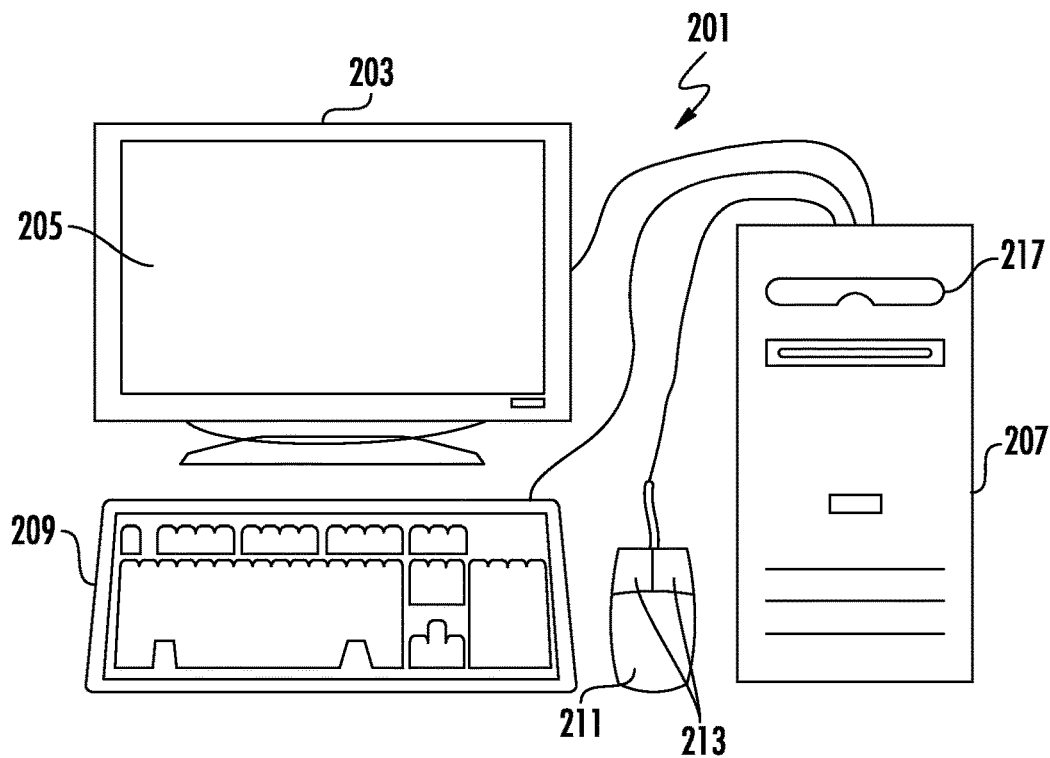
FIG. 2 shows a more detailed diagram of a client or server.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
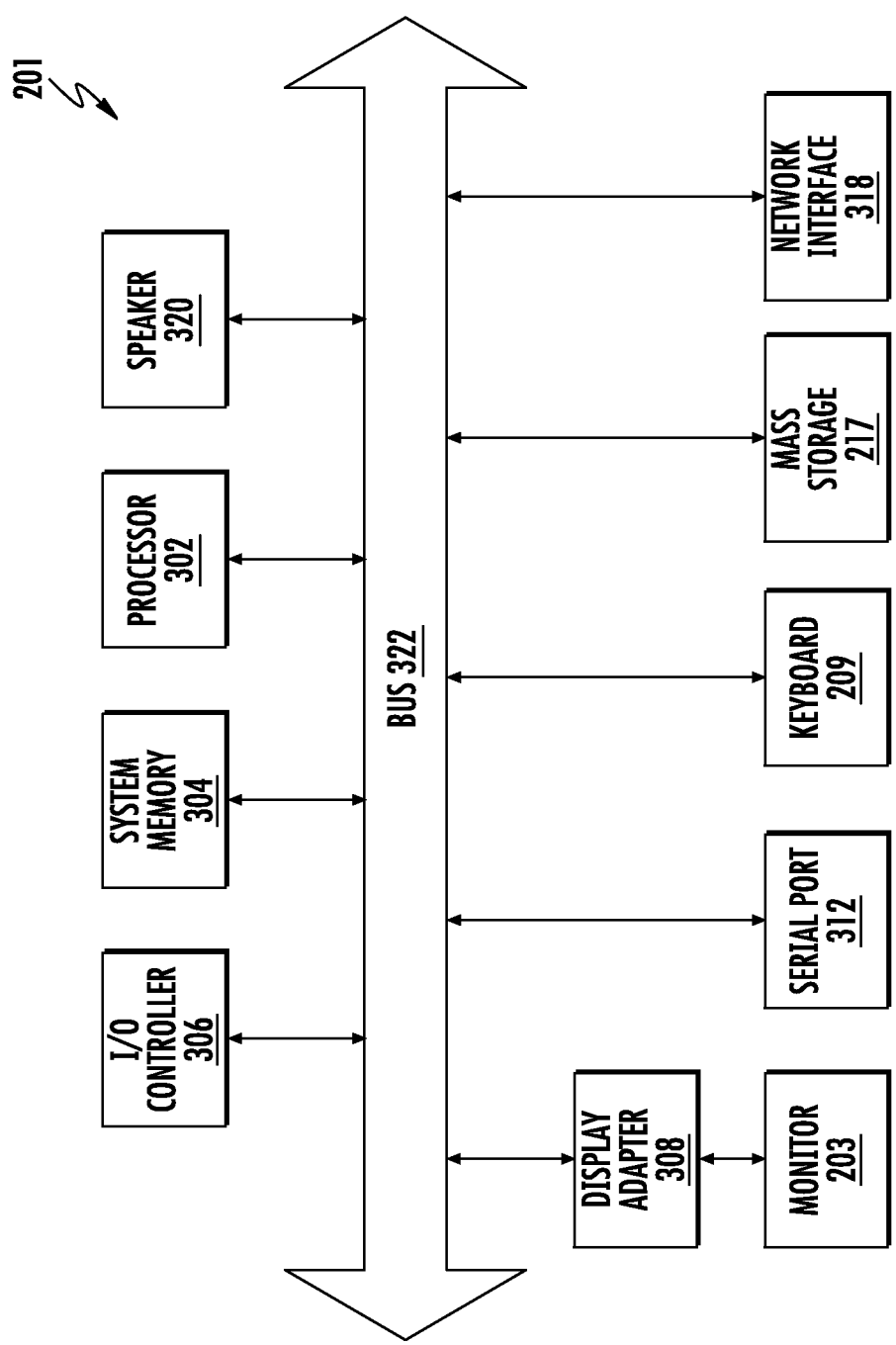
FIG. 3 shows a system block diagram of a computer system.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C #, Pascal, Fortran, Perl, Matlab (from MathWorks, www-.mathworks.com), SAS, SPSS, JavaScript, AJAX, Java, Python, Erlang, and Ruby on Rails.

The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

Figure 4:
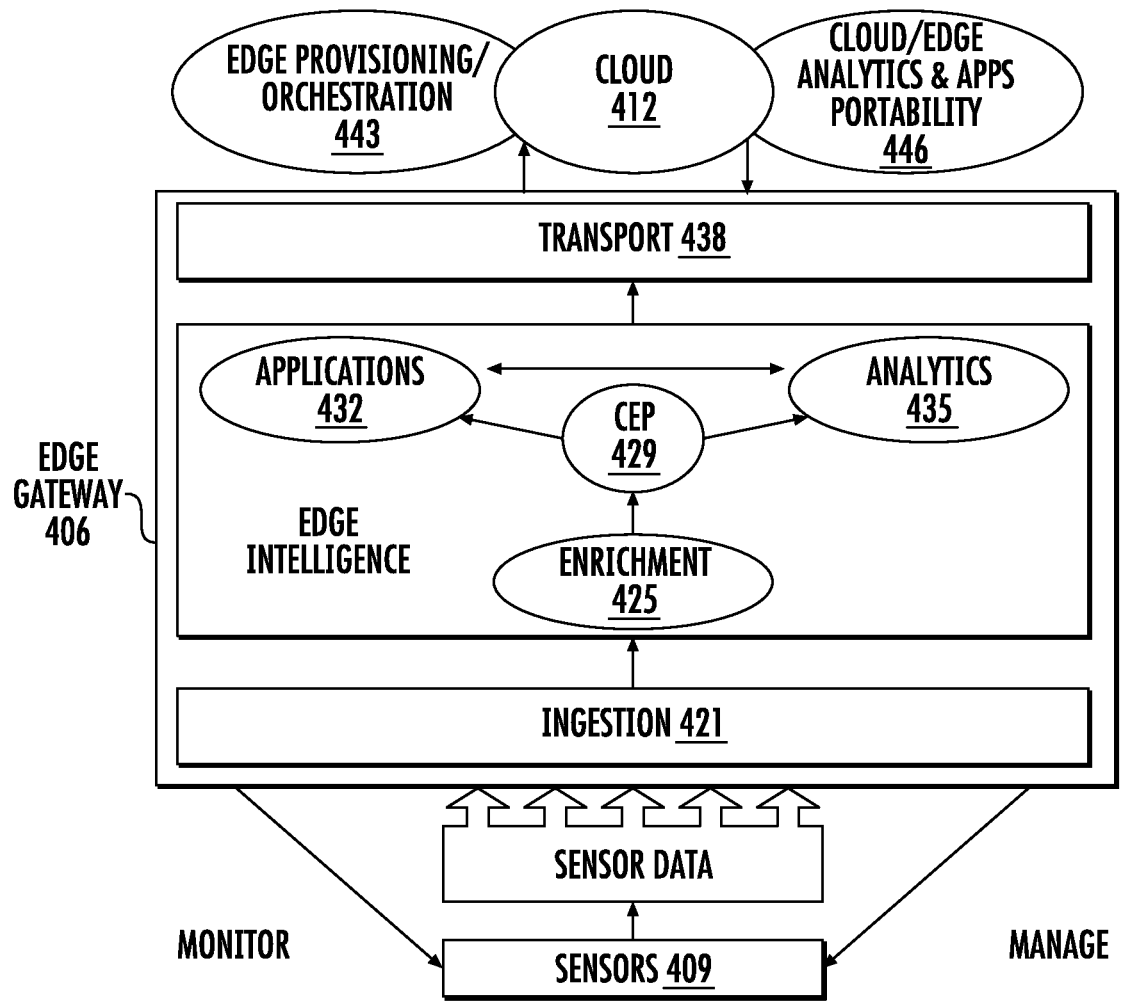
FIG. 4 a block diagram of an edge computing platform, which is between sensor streams and the cloud.

FIG. 4 shows a block diagram of an edge computing platform 406 typically running on an edge gateway or equivalent that is between sensors 409 and cloud 412. The edge computing platform enables deriving edge intelligence that is important for managing and optimizing industrial machines and other industrial Internet of things. Components of the edge gateway include the following: ingestion 421, enrichment 425, complex event processing (CEP) engine 429, applications 432, analytics through an expression language 435, and transport 438. The cloud can include edge provisioning and orchestration 443 and cloud and edge analytics and apps portability 446.

As discussed above, a specific implementation of an edge computing platform is from FogHorn. FogHorn is a leader in the rapidly emerging domain of "edge intelligence." By hosting high performance processing, analytics, and heterogeneous applications closer to control systems and physical sensors, FogHorn's breakthrough solution enables edge intelligence for closed loop device optimization. This brings big data and real-time processing onsite for industrial customers in manufacturing, oil and gas, power and water, transportation, mining, renewable energy, smart city, and more. FogHorn technology is embraced by the world's leading industrial Internet innovators and major players in cloud computing, high performance edge gateways, and IoT systems integration.

Foghorn provides: Enriched IoT device and sensor data access for edge apps in both stream and batch modes. Highly efficient and expressive DSL for executing analytical functions. Powerful miniaturized analytics engine that can run on low footprint machines. Publishing function for sending aggregated data to cloud for further machine learning. SDK (polyglot) for developing edge apps. Management console for managing edge deployment of configurations, apps, and analytics expressions.

FogHorn provides an efficient and highly scalable edge analytics platform that enables real-time, on-site stream processing of sensor data from industrial machines. The FogHorn software stack is a combination of services that run on the edge and cloud.

An "edge" solutions may support ingesting of sensor data into a local storage repository with the option to publish the unprocessed data to a cloud environment for offline analysis. However many industrial environments and devices lack Internet connectivity making this data unusable. But even with Internet connectivity, the sheer amount of data generated could easily exceed available bandwidth or be too cost prohibitive to send to the cloud. In addition, by the time data is uploaded to the cloud, processed in the data center, and the results transferred back to the edge, it may be too late to take any action.

The FogHorn solution addresses this problem by providing a highly miniaturized complex event processing (CEP) engine, also known as an analytics engine, and a powerful and expressive domain specific language (DSL) to express rules on the multitude of the incoming sensor streams of data. Output from these expressions can then be used immediately to prevent costly machine failures or downtime as well as improve the efficiency and safety of industrial operations and processes in real time.

The FogHorn platform includes: Ability to run in low footprint environments as well as high throughput or gateway environments. Highly scalable and performant CEP engine that can act on incoming streaming sensor data. Heterogeneous app development and deployment on the edge with enriched data access. Application mobility across the cloud and edge. Advanced machine learning (ML) and model transfer between cloud and edge. Out of the box, FogHorn supports the major industrial data ingestion protocols (e.g. OPC-UA, Modbus, MQTT, DDS, and others) as well as other data transfer protocols. In addition, users can easily plug-in custom protocol adaptors into FogHorn's data ingestion layer.

FogHorn edge services operate at the edge of the network where the IIoT devices reside. The edge software stack is responsible for ingesting the data from sensors and industrial devices onto a high speed data bus and then executing user-defined analytics expressions on the streaming data to gain insights and optimize the devices. These analytical expressions are executed by FogHorn's highly scalable and small footprint complex event processing (CEP) engine.

FogHorn edge services also include a local time-series database for time-based sensor data queries and a polyglot SDK for developing applications that can consume the data both in stream and batch modes. Optionally, this data can also be published to a cloud storage destination of the customer's choice.

The FogHorn platform also includes services that run in the cloud or on-premises environment to remotely configure and manage the edges. FogHorn's cloud services include a management UI for developing and deploying analytics expressions, deploying applications to the edge using an application known as Docker (www.docker.com), and for managing the integration of services with the customer's identity access management and persistence solutions. The platform will also be able to translate machine learning models developed in the cloud into sensor expressions that can be executed at the edge.

FogHorn brings a groundbreaking dimension to the industrial Internet of things by embedding edge intelligence computing platform directly into small footprint edge devices. The software's extremely low overhead allows it to be embedded into a broad range of edge devices and highly-constrained environments.

Available in Gateway and Micro editions, FogHorn software enables high performance edge processing, optimized analytics, and heterogeneous applications to be hosted as close as possible to the control systems and physical sensor infrastructure that pervade the industrial world. Maintaining close proximity to the edge devices rather than sending all data to a distant centralized cloud, minimizes latency allowing for maximum performance, faster response times, and more effective maintenance and operational strategies. It also significantly reduces overall bandwidth requirements and the cost of managing widely distributed networks.

FogHorn Gateway Edition. The FogHorn Gateway Edition is a comprehensive fog computing software suite for industrial IoT use-cases across a wide range of industries. Designed for medium to large scale environments with multiple Industrial machines or devices, this edition enables user-configurable sensor data ingestion and analytics expressions and supports advanced application development and deployment.

FogHorn Micro Edition. The FogHorn Micro Edition brings the power of fog computing to smaller footprint edge gateways and other IoT machines. The same CEP analytics engine and highly expressive DSL included in the Gateway edition are available in the Micro Edition. This edition is ideal for enabling advanced edge analytics in embedded systems or any memory-constrained devices.

As examples, an application applies real-time data monitoring and analysis, predictive maintenance scheduling, and automated flow redirection to prevent costly damage to pumps due to cavitation events. Another example is wind energy management system using FogHorn edge intelligence software to maximize power generation, extend equipment life, and apply historical analysis for accurate energy forecasting.

Figure 5:
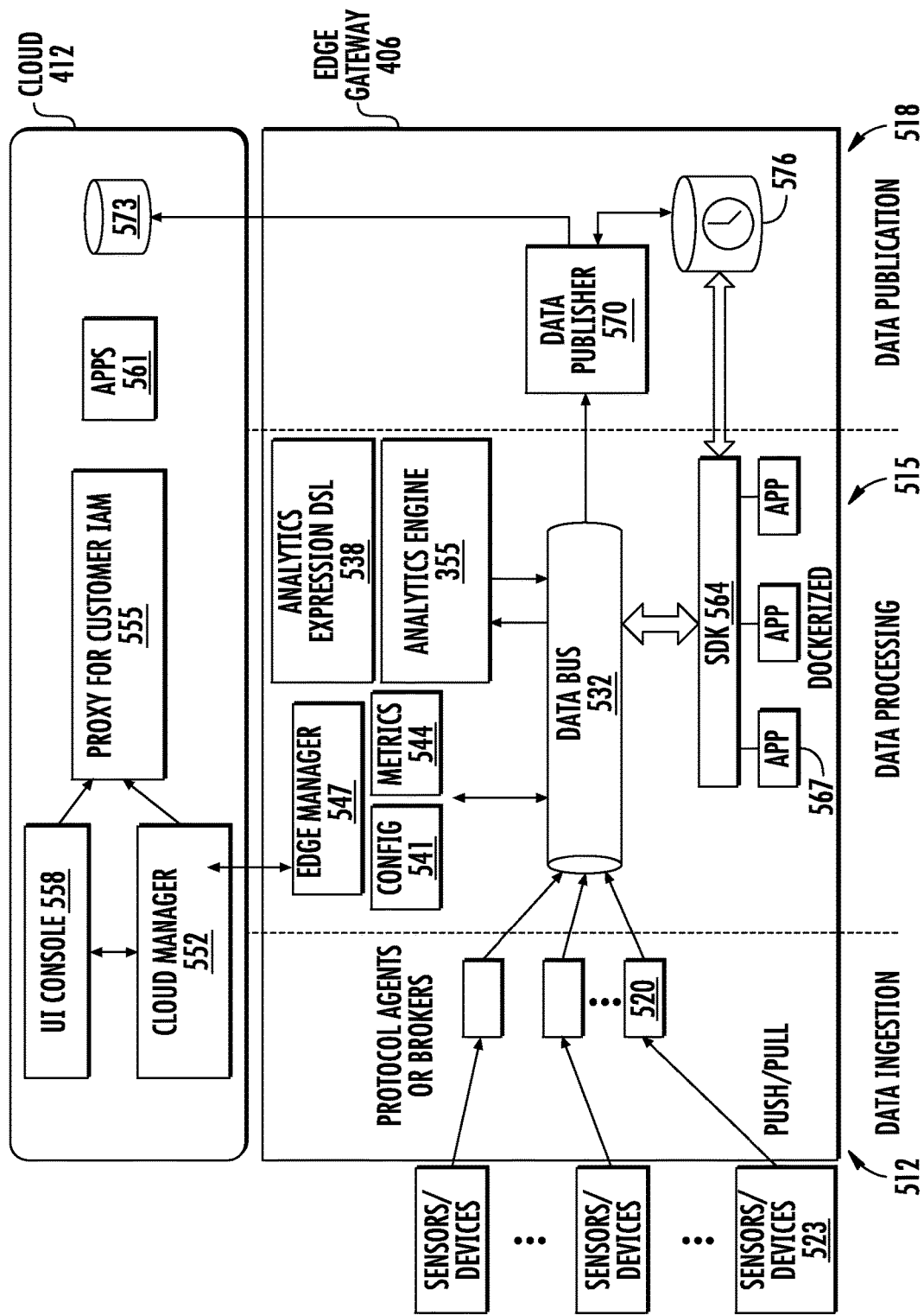
FIG. 5 shows a more detailed block diagram of an edge computing platform including edge analytics.

FIG. 5 shows a more detailed block diagram of an edge computing platform. This platform has three logical layers or sections, data ingestion 512, data processing 515, and data publication 518. The data ingestion components include agents 520 that are connected to sensors or devices 523 that generate data. The agents collect or ingest data from the sensors via one or more protocols from the respective protocol servers. The agents can be clients or brokers for protocols such as, among others, MQTT, OPC UA, Modbus, and DDS. The data provided or output by the sensors is typically a binary data stream. The transmission or delivery of this data from the sensors to the agents can be by push or pull methods.

Push describes a style of communication where the request for a given transaction is initiated by the sender (e.g., sensor). Pull (or get) describes a style of communication where the request for the transmission of information is initiated by receiver (e.g., agent). Another communication technique is polling, which the receiver or agent periodically inquires or checks the sensor has data to send.

MQTT (previously MQ Telemetry Transport) is an ISO standard publish-subscribe-based "lightweight" messaging protocol for use on top of the TCP/IP protocol. Alternative protocols include the Advanced Message Queuing Protocol, the IETF Constrained Application Protocol, XMPP, and Web Application Messaging Protocol (WAMP).

OPC Unified Architecture (OPC UA) is an industrial M2M communication protocol for interoperability developed by the OPC Foundation. It is the successor to Open Platform Communications (OPC).

Modbus is a serial communications protocol originally published by Modicon (now Schneider Electric) in 1979 for use with its programmable logic controllers (PLCs). Simple and robust, it has since become for all intents and purposes a standard communication protocol. It is now a commonly available means of connecting industrial electronic devices.

Data processing 515 includes a data bus 532, which is connected to the agents 520 of the data ingestion layer. The data bus is the central backbone for both data and control messages between all connected components. Components subscribe to the data and control messages flowing through the data bus. The analytics engine 535 is one such important component. The analytics engine performs analysis of the sensor data based on an analytic expressions developed in expression language 538. Other components that connect to the data bus include configuration service 541, metrics service 544, and edge manager 547. The data bus also includes a "decoder service" that enriches the incoming data from the sensors by decoding the raw binary data into consumable data formats (such as JSON) and also decorating with additional necessary and useful metadata. Further, enrichment can include, but is not limited to, data decoding, metadata decoration, data normalization, and the like.

JSON (sometimes referred to as JavaScript Object Notation) is an open-standard format that uses human-readable text to transmit data objects consisting of attribute-value pairs. JSON is a common data format used for asynchronous browser or server communication (AJAJ) or both. An alternative to JSON is XML, which is used by AJAX.

The edge manager connects to cloud 412, and in particular to a cloud manager 552. The cloud manager is connected to a proxy for customer identity and access management (IAM) 555 and user interface console 558, which are also in the cloud. There are also apps 561 accessible via the cloud. Identity and access management is the security and business discipline that enables the right individuals to access the right resources at the right times and for the right reasons.

Within data processing 515, a software development kit (SDK) 564 component also connects to the data bus, which allows the creation of applications 567 that work that can be deployed on the edge gateway. The software development kit also connects to a local time-series database to fetch the data. The applications can be containerized, such as by using a container technology such as Docker.

Docker containers wrap up a piece of software in a complete file system that contains everything it needs to run: code, runtime, system tools, and system libraries—anything that can be installed on a server. This ensures the software will always run the same, regardless of the environment it is running in.

Data publication 518 includes a data publisher 570 that is connected to a storage location 573 in the cloud. Also, applications 567 of the software development kit 564 can access data in a time-series database 576. A time-series database (TSDB) is a software system that is optimized for handling time series data, arrays of numbers indexed by time (e.g., a date-time or a date-time range). The time-series database is typically a rolling or circular buffer or queue, where as new information is added to the database, the oldest information is being removed. A data publisher 570 also connects to the data bus and subscribes to data that needs to be stored either in the local time-series database or in the cloud storage.

Figure 6:
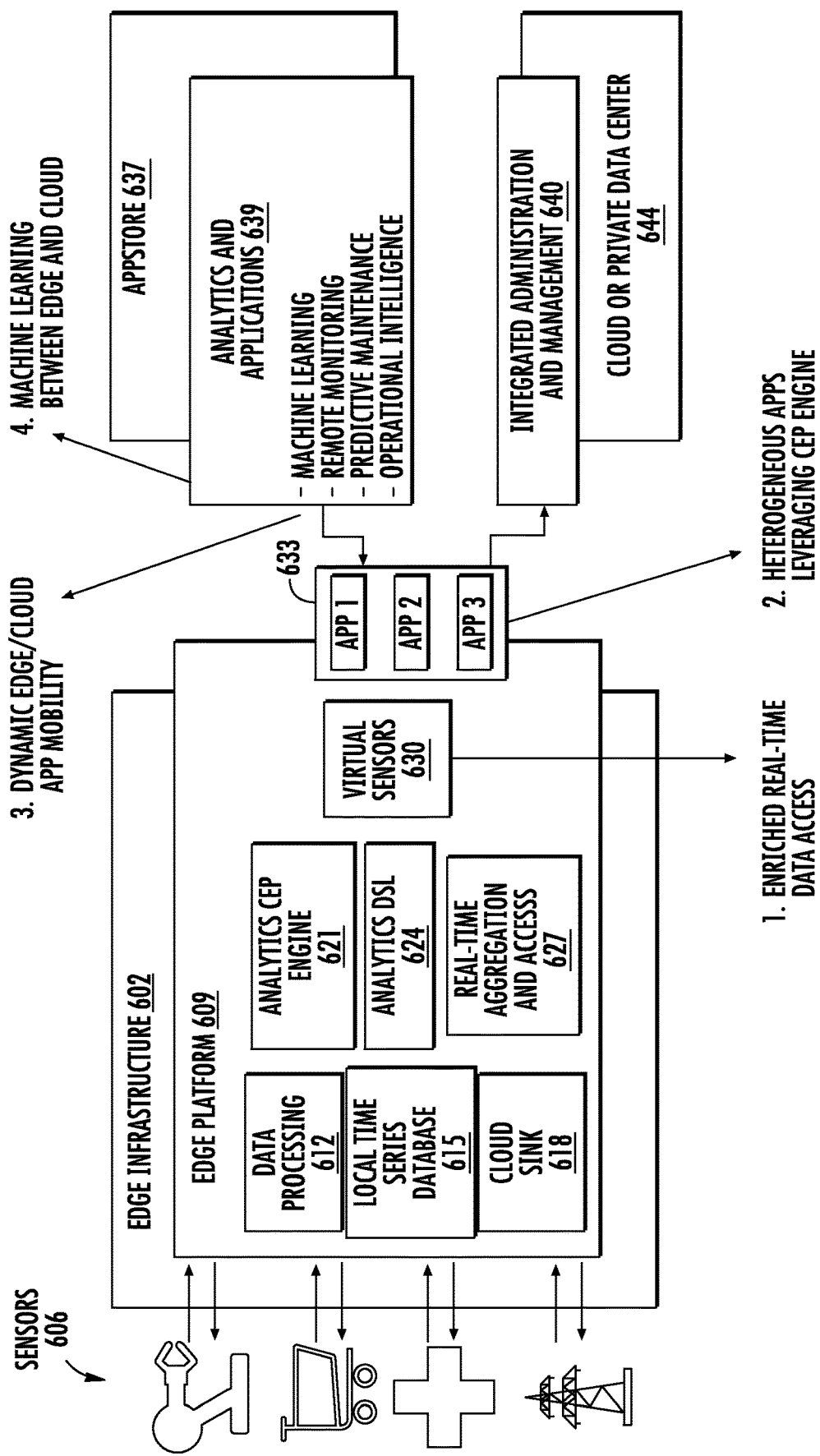
FIG. 6 shows an operational flow between edge infrastructure and cloud infrastructure.

FIG. 6 shows an operational flow between edge 602 and cloud infrastructures. Some specific edge infrastructures were described above. Data is gathered from sensors 606. These sensors can be for industrial, retail, health care, or medical devices, or power or communication applications, or any combination of these.

The edge infrastructure includes a software platform 609, which has data processing 612, local time-series database 615, cloud sink 618, analytics complex event processing engine (CEP) 621, analytics real-time streaming domain-specific language (DSL) 624 (e.g., the Vel language by Foghorn), and real-time aggregation and access 627. The platform can include virtual sensors 630, which are described below in more detail. The virtual sensors provide enriched real-time data access.

The platform is accessible via one or more apps 633, such as apps or applications 1, 2, and 3, which can be developed using a software development kit or SDK. The apps can be heterogeneous (e.g., developed in multiple different languages) and leverage complex event processing engine 621, as well as perform machine learning. The apps can be distributed using an app store 637, which may be provided by the edge platform developer or the customer of the edge platform (which may be referred to as a partner). Through the app store, users can download and share apps with others. The apps can perform analytics and applications 639 including machine learning, remote monitoring, predictive maintenance, or operational intelligence, or any combination of these.

For the apps, there is dynamic app mobility between edge and cloud. For example, applications developed using the FogHorn software development kit can either be deployed on the edge or in the cloud, thereby achieving app mobility between edge and cloud. The apps can be used as part of the edge or as part of the cloud. In an implementation, this feature is made possible due to the apps being containerized, so they can operate independent of the platform from which they are executed. The same can be said of the analytics expressions as well.

There are data apps that allow for integrated administration and management 640, including monitoring or storing of data in the cloud or at a private data center 644.

The edge application infrastructure can provide real-time feedback and automated control systems to some of the toughest and most remote industrial environments. Some specific applications are described below:

Manufacturing. From creating semiconductors to the assembly of giant industrial machines, edge intelligence platform enables enhancing manufacturing yields and efficiency using real-time monitoring and diagnostics, machine learning, and operations optimization. The immediacy of edge intelligence enables automated feedback loops in the manufacturing process as well as predictive maintenance for maximizing the uptime and lifespan of equipment and assembly lines.

Oil and Gas. Oil and gas extraction are high-stakes technology-driven operations that depend on real-time onsite intelligence to provide proactive monitoring and protection against equipment failure and environmental damage. Because these operations are very remote and lack reliable high speed access to centralized data centers, edge intelligence provides onsite delivery of advanced analytics and enables real-time responses required to ensure maximum production and safety.

Mining. Mining faces extreme environmental conditions in very remote locations with little or no access to the Internet. As a result, mining operations are relying more and more on edge intelligence for real-time, onsite monitoring and diagnostics, alarm management, and predictive maintenance to maximize safety, operational efficiency, and to minimize costs and downtime.

Transportation. As part of the rise in the Industrial Internet, trains and tracks, buses, aircraft, and ships are being equipped with a new generation of instruments and sensors generating petabytes of data that will require additional intelligence for analysis and real-time response. Edge intelligence can process this data locally to enable real-time asset monitoring and management to minimize operational risk and downtime. It can also be used to monitor and control engine idle times, detect wear and tear ahead of time, detect track problems, detect potential intruders, to reduce emissions, conserve fuel, and maximize profits.

Power and Water. The unexpected failure of an electrical power plant can create substantial disruption to the downstream power grid. The same holds true when water distribution equipment and pumps fail without warning. To avoid this, edge intelligence enables the proactive benefits of predictive maintenance and real-time responsiveness. It also enables ingestion and analysis of sensor data closer to the source rather than the cloud to reduce latency and bandwidth costs.

Renewable Energy. New solar, wind, and hydro are very promising sources of clean energy. However constantly changing weather conditions present major challenges for both predicting and delivering a reliable supply of electricity to the power grid. Edge intelligence enables real-time adjustments to maximize power generation as well as advanced analytics for accurate energy forecasting and delivery.

Health Care. In the healthcare industry, new diagnostic equipment, patient monitoring tools, and operational technologies are delivering unprecedented levels of patient care but also huge amounts highly sensitive patient data. By processing and analyzing more data at the source, medical facilities can optimize supply chain operations and enhance patient services and privacy at a much lower cost.

Retail. To compete with online shopping, retailers must lower costs while creating enhanced customer experiences and levels of service that online stores cannot provide. Edge intelligence can enrich the user experience by delivering real-time omni channel personalization and supply chain optimization. It also enables newer technologies such as facial recognition to deliver even higher levels of personalization and security.

Smart Buildings. Among the many benefits of smart building technology are lower energy consumption, better security, increased occupant comfort and safety, and better utilization of building assets and services. Rather than sending massive amounts of building data to the cloud for analysis, smart buildings can use edge intelligence for more responsive automation while reducing bandwidth costs and latency.

Smart Cities. Integrating data from a diverse collection of municipal systems (e.g. Street lighting, traffic information, parking, public safety, and others) for interactive management and community access is a common vision for smart city initiatives. However the sheer amount of data generated requires too much bandwidth and processing for cloud-based systems. Edge intelligence provides a more effective solution that distributes data processing and analytics to the edges where sensors and data sources are located.

Connected Vehicles. Connected vehicle technology adds an entirely new dimension to transportation by extending vehicle operations and controls beyond the driver to include external networks and systems. Edge intelligence and fog computing will enable distributed roadside services such as traffic regulation, vehicle speed management, toll collection, parking assistance, and more.

Industrial AppStore for IoT

The Internet of Things (IoT) has demands for software and analytics to be applied on sensor data from instrumented physical operations (like factories, warehouses, retail stores, and others). The system includes an application distribution facility or application store (AppStore) and methods for such an AppStore marketplace that addresses the unique reliability, security, deployment, and data-management needs of the industrial IoT use-cases in a software platform apparatus called Industrial AppStore for IoT.

1. Application manifest: Industrial IoT applications have deep deployment context that can be captured as metadata and stored with the application. The context includes Edge hardware specifications, deployment location, information about compatible systems, data-access manifest for security and privacy, emulators for modeling data fields unavailable in a given deployment and version management. The edge hardware includes a physical layer between physical sensors and a external communication channels. The edge computing platform can be used to define virtual or software programmable sensors. The edge computing platform may be implemented in software, hardware, firmware, embedded hardware, standalone hardware, application specific-hardware, or any combination of these.

2. Manifest matching: Based on a given request from edge platform, the AppStore is configured to match the right manifest with the deployment scenario based on the parameters listed above.

3. Deployment operations: The Industrial AppStore platform also performs operational tasks specific to industrial Edge deployment scenarios including data consistency, application state hand-off and security credentials management. These are essential stages of the migration process for applications moving from the cloud or data center location to the edge as application-container objects.

Programmable Software-Defined Sensors or Virtual Sensors

A physical sensor is an electronic transducer, which measures some characteristics of its environment as analog or digital measurements. Analog measurements are typically converted to digital quantities using analog to digital Converters. Sensor data are either measured on need based (polled) or available as a stream at a uniform rate. Typical sensor specifications are range, accuracy, resolution, drift, stability, and other attributes. Most measurement systems and applications utilize or communicate the sensor data directly for processing, transportation, or storage.

The system has a "programmable software-defined sensor," also called a virtual sensor, which is a software based sensor created using an analytics expression language. In an implementation, the analytics expression language is Fog-Horn's analytics expression language. This expression language is known as Vel and is described in more detail in other patent applications. The Vel language is implemented efficiently to support real-time streaming analytics in a constrained low footprint environment with low latencies of execution. For example, a latency of the system can be about 10 milliseconds or less.

In an implementation, the programmable software-defined sensor is created with a declarative application program interface (API) called a "sensor expression language" or SXL. A specific implementation of an SXL language is Vel from FogHorn. An SXL-sensor is a SXL-sensor created through this construct, and provides derived measurements from processing data generated by multiple sources including physical and SXL-sensors. In this application, SXL and Vel are used interchangeably.

An SXL (e.g., Vel) sensor can be derived from any one of or a combination of these three sources:

1. A single sensor data.

1.1. A virtual or S×L sensor derived from a single physical sensor could transform the incoming sensor data using dynamic calibration, signal processing, math expression, data compaction or data analytics, of any combination.

2. Multiple physical sensor data.

2.1. A virtual or S×L sensor or derived as a transformation (using the methods described above) from multiple heterogeneous physical sensors.

3. A combination of physical sensor data and virtual sensor data made available to the implementation of the SXL-sensor (e.g., Vel) apparatus.

SXL (e.g., Vel) sensors are domain-specific and are created with a specific application in mind. A specific implementation of SXL programming interface enables applications to define data analytics through transformations (e.g., math expressions) and aggregations. SXL (e.g., Vel) includes a set of mathematical operators, typically based on a programming language. S×L sensors operate at runtime on data by executing SXL constructs or programs.

Creation of SXL Sensors. S×L sensors are designed as software apparatus' to make data available in real-time. This requires the execution of applications developed with the SXL in real-time on embedded compute hardware to produce the SXL-sensor data at a rate required by the application. The system includes a highly efficient execution engine to accomplish this.

Benefits of S×L sensors include:

1. Programmability: SXL makes S×L sensors programmable to synthesize data to match specific application requirements around data quality, frequency and information. SXL-sensors can be widely distributed as over-the-air software upgrades to plug into data sourced from physical sensors and other (e.g., preexisting) S×L sensors. Thus application developers can create a digital infrastructure conducive to the efficient execution of business logic independent of the layout of the physical infrastructure.

2. Maintainability or Transparency: SXL-sensors create a digital layer of abstraction between applications and physical sensors, which insulates developers from changes in the physical infrastructure due to upgrades and services to the physical sensors.

3. Efficiency: SXL-sensors create efficiencies in information management by transforming raw data from physical sensors into a precise representation of information contained in them. This efficiency translates into efficient utilization of IT resources like compute, networking, and storage downstream in the applications.

4. Real-time data: SXL-sensors provide real-time sensor data that is computed from real-world or physical sensor data streams. This makes the data available for applications with minimum time delays.

Implementation: The system has architected a scalable, real-time implementation of SXL-sensors based on an SXL interface. SXL includes operators supported by Java language and is well integrated with physical sensors and their protocols.

The system brings a novel methodology for precisely expressing the operations on physical sensors' data to be executed. This declarative expression separates the definition of the digital abstraction from the implementation on the physical sensors.

Table A provides an example of physical sensors and SXL-sensors created with SXL.

TABLE A

Physical_sensors:
name: "pump"
measures:
-
name: "flow"
serde: "CSV"
protocol: "MQTT"
field_map:
p1: "flow"
-
name: "outlet_pressure"
serde: "CSV"
protocol: "MQTT"

TABLE A-continued field_map:
p1: "outlet_pressure"
-
name: "temperature"
serde: "CSV"
protocol: "MQTT"
field_map:
p1: "temperature"
-
name: "inlet_pressure"
serde: "CSV"
protocol: "MQTT"
field_map:
p1: "inlet_pressure"
virtual_sensors:
-

TABLE A-continued name: "pressure_differential"
expression: "pressure_differential = inlet_pressure - outlet_pressure"
-
name: "temperature_kelvin"
expression: "temperature_kelvin = (temperature + 459.67) * (5.0/9.0)"
-
name: "vapor_pressure"
expression: "vapor_pressure = exp(20.386 − (5132.0 / temperature_kelvin))"

In the above example, four physical sensors are used to create a set of SXL-sensors. The SXL-sensor data can be sent to local storage or application and or to other remote services (e.g. cloud) for further analysis.

As a specific example, in table A, there is a virtual sensor named "pressure_differential." There is a variable pressure_differential (for pressure differential) that is an output. Inputs to the virtual sensor are inlet_pressure (for inlet pressure) and outlet_pressure (for outlet pressure). This virtual sensor outputs pressure_differential based on a function inlet_pressure minus outlet_pressure.

Table A has another virtual sensor named "temperature_kelvin." The output is temperature kelvin which is a function of (temperature+459.67)*(5.0/9.0), where temperature is an input to the sensor.

Table A has another virtual sensor named "vapor_pressure." The output is vapor_pressure which is a function of exp(20.386-(5132.0/temperature_kelvin), where temperature_kelvin is an input to the sensor. The variable temperature_kelvin is the output from the temperature_kelvin sensor.

Table B provides an example of defining virtual sensors using FogHorn's Vel expression language.

TABLE B temperature is stream("temperature", real);
inlet_pressure is stream("inlet_pressure", real);
outlet_pressure is stream("outlet_pressure", real);
local_pressure_differential is local_stream("local_pressure_differential", real);
pressure_differential is stream("pressure_differential", real);
cavitation_alert is stream("cavitation_alert", int);
local_temperature_kelvin is local_stream("local_temperature_kelvin", real);
temperature_kelvin is stream("temperature_kelvin", real);
vapour_pressure is stream("vapour_pressure", real);
local_pressure_differential = (a-b) select a from inlet_pressure with b from outlet_pressure;
pressure_differential = p select p from local_pressure_differential;
cavitation_alert = 1 if local_pressure_differential > 25 else 0;
local_temperature_kelvin = ((temp + 459.67) * 5 / 9) select temp from temperature;
temperature_kelvin = t select t from local_temperature_ kelvin;
vapour_pressure = (20.386 − (5132.0 / tk)) select tk from local_temperature_kelvin;

In the above example, three physical sensor data streams are used to create a set of virtual sensors used later on to detect a pump cavitation scenario. The virtual sensors can either be a local stream or be published as first class data streams on the data bus.

Figure 7:
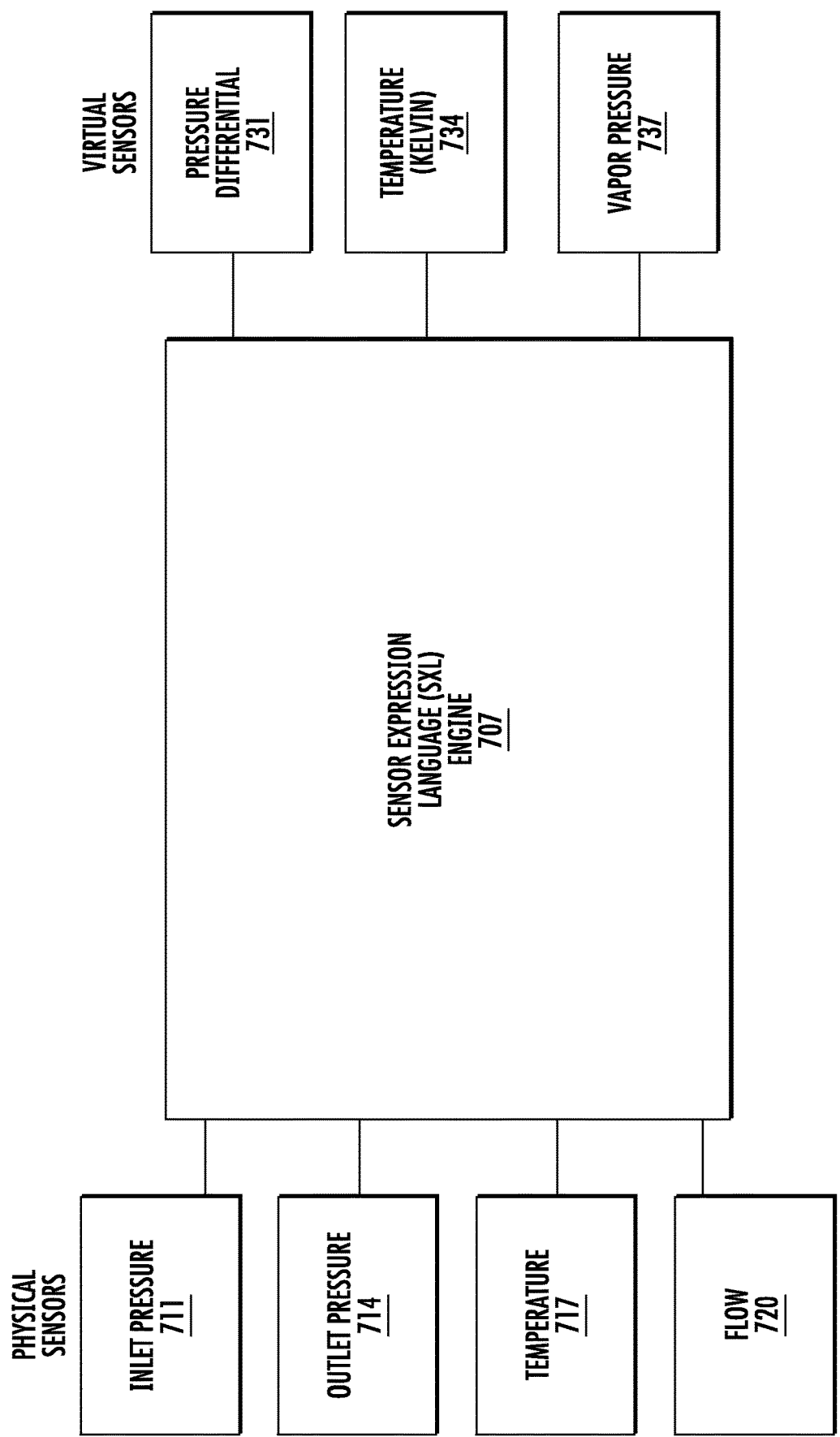
FIG. 7 shows an example of using physical sensors to create, via a sensor expression language engine, some virtual sensors.

FIG. 7 shows sensor expression language engine 707 that is used to create virtual sensors from inputs. The sensor expression language engine takes input from physical sensors or other virtual sensors. Some examples of inputs include inlet pressure 711, outlet pressure 714, temperature 717, and flow 720. Any number of inputs or combination of inputs can be used as input to a virtual sensor. Based on the input, the sensor expression language engine can generate an virtual sensors with outputs, such as pressure differential 731, temperature 734 (which may be in Kelvin), and vapor pressure 737. There can be any number of virtual sensors and outputs. As described, the output can be a mathematical function of the inputs to the virtual sensor.

Although FIG. 7 shows a box (e.g., 731, 734, and 737) that is representative of a virtual sensor. A virtual sensor can have multiple outputs. For example, virtual sensors 731 and 734 can be combined into a single virtual sensor having two outputs. Virtual sensors 731, 734, and 737 can be combined into a single virtual sensor having three outputs.

Application Mobility Between Edge and Cloud

Traditional enterprise software application hosting has relied on datacenter or "cloud" infrastructure to exploit economies of scale and system efficiencies. However, these datacenters can be arbitrarily distant from the points of physical operations (like factories, warehouses, retail stores, and other facilities), where the enterprise conducts most of its business operations. The Internet of Things (IoT) is a collection of use-cases that relies on instrumentation of the physical operations with sensors that track events with very high frequency.

The system includes a method and apparatus for seamless interoperability and mobility of software applications between backend datacenter or cloud and frontline edge infrastructure layers:

1. The apparatus is a software platform that can be deployed in different form-factors across cloud, medium-sized compute servers and miniaturized compute servers with the same set of application program interfaces (APIs) that applications can use to accomplish data management, data analytics, and administrative tasks over the physical operations.

1.1. Data management includes ingestion of streams of data from multiple network interfaces at the edge layer, data enrichment, storage, resiliency against hardware and software failures and consistency of data 1.2. Data analytics includes complex event processing (CEP) engine, an expression language for analytics or stream processing, or both, aggregation, rules and select machine learning workflows at the edge.

1.3. Administrative capabilities include resource provisioning, configuration and setup at the edge layer and application lifecycle task management.

2. The system also includes a method for migrating these applications between the cloud and edge infrastructure layers over the Internet, while maintaining consistency in the state of application and data managed.

3. The method leverages application container technologies for packaging software libraries needed for consistent migration or execution across different platforms.

4. The method can also have a recommender system that takes into account resource availability, application quality-of-service (QoS) demands and priority to schedule such migrations between the cloud and edge layers of infrastructure.

5. The method also permits cooperating applications to execute at both the cloud and edge layers of the infrastructure and leverage the apparatus (e.g., edge platform) to manage interapplication communications.

Applications developed on the edge can be run in the cloud and vice versa. This is true for machine learning applications as well.

Remotely Managed Workflows

The portions of the system described above that are part of the edge computing software can be remotely managed through a management console backed by a few microservices. Multiple different edge installations can be configured, deployed, managed and monitored through this remote management console.

A method for enabling intelligence at the edge. Features include: triggering by sensor data in a software layer hosted on either a gateway device or an embedded system. Software layer is connected to a local-area network. A repository of services, applications, and data processing engines is made accessible by the software layer. Matching the sensor data with semantic descriptions of occurrence of specific conditions through an expression language made available by the software layer. Automatic discovery of pattern events by continuously executing expressions. Intelligently composing services and applications across the gateway device and embedded systems across the network managed by the software layer for chaining applications and analytics expressions. Optimizing the layout of the applications and analytics based on resource availability. Monitoring the health of the software layer. Storing of raw sensor data or results of expressions in a local time-series database or cloud storage. Services and components can be containerized to ensure smooth running in any gateway environment.

In an implementation, a method for service invocation triggered by sensor data in a software apparatus hosted on a gateway device and connected to a wide-area network, where a repository of services, applications and data-processing engines is made accessible by the apparatus; matching the sensor data with semantic descriptions of data made available by the apparatus; discovering all applications designed for the pattern of semantic types of data matched; intelligently composing services across the gateway device and servers distributed across the wide-area network managed by the software apparatus for chaining all applications and analytics matched; optimizing the layout of the applications and analytics based on resource availability at the gateway device.

1. Technical Field: The present invention relates to the field of the Internet of Things, specially distributed software for deriving real-time data-driven decisions from sensors.

2. Discussion: There is an explosive growth in sensor data set by declining cost of sensors and network collectively denoted as the Internet of Things. The abstraction of data generalizes Internet of Things across a variety of industry verticals including manufacturing, energy and utilities, urban infrastructure, healthcare, retail, agriculture and resources, home automation, and consumer wearable devices. However, the burgeoning costs of software development, testing, deployment, and management add economic hurdles to ingesting, aggregating, managing, and processing these sensor data for creating value in terms of process efficiencies, business profitability, and revenue monetization. These economic hurdles to software for the Internet of Things can be categorized into four types:

1. Heterogeneity: Data sources in the physical world are inherently heterogeneous and pile up on the cost of software development and testing.

2. Last-mile Gaps: These gaps are between datacenters and physical sensor for reliably deploying software applications with high quality of service 3. Security: Sensors are new sources of data carving new information pathways with less defined data governance and security policies.

4. Silos: Repetitive data acquisition, processing, and management across silos of applications leads to inefficient use of hardware and development resources.

The system provides a method and a software apparatus designed for addressing these challenges in the last-mile close to the sensors. The intelligence in the invented apparatus can discover the semantics of sensor data; customize the composition of services and analytics, and chain the deployment of software applications.

Some embodiments of the invention include the method and an apparatus for enabling software applications to access data from a variety of sensors spread over a wide area, and provide real-time responses and messages based on data and analytics. The apparatus is designed to be deployed on embedded gateway devices near sensors and server infrastructure in datacenters managed by enterprises or cloud service providers. Application developers express data semantics used by their software to this apparatus, and expose their repository of applications to it. Gateway devices have access to physical sensors through network interfaces in their hardware systems.

The method claimed solves the heterogeneity, last-mile gap, security and data silo challenges of IoT software as follows:

1.1. Sensor data reaches the software apparatus through the network interfaces in the gateway device. The software apparatus examines the message headers for patterns indicating known data protocols supported.

1.2. On discovery of a pattern of a supported protocol, the apparatus loads the relevant protocol broker service, in the first stage of the composition.

2. The software apparatus discovers dimensions of data semantics in the data streaming through the protocol broker, matches patterns in the semantics expressed by application developers, and creates a scored list of matched elements. All matching scans are secured by a token-exchange protocol to ensure developers have access to the data being matched. The apparatus can load the data semantics with the highest match score, or recommend the same through a human machine interface for manual confirmation. The service composition adds the developer data semantics.

3. The software apparatus then mixes sensor data from different physical sources to match the applications definition of data semantics.

4. The application's analytics service dependencies are analyzed and provisioned by the software apparatus on the gateway device near the sensors, as well as other servers in datacenters under the management of the same apparatus.

5. The data streaming with the appropriate semantics are channeled through data processing pipelines by the software apparatus to transform the data as needed by the application.

6. The apparatus also manages the transfer of data across wide-area networks over secured links for consistency between analytic processing pipelines spread geographically 7. The application can securely access the transformed data through programmatic APIs (with token-exchange based security) disclosed to the developers in the software apparatus' manuals. The applications are chained to the service composition at the appropriate venue (gateway device, datacenter server) based on the quality of service need and availability of resources at that instance.

The stages 1 to 7 above describe the method used by the software apparatus to compose a service chain intelligently by leveraging dynamic context from sensor data and applications in the repository. This method and the software apparatus thus solve the challenges of software engineering for IoT described above.

Heterogeneous Sensor Agnostic Software and Data Management

The Internet of Things (IoT) brings value to business operations through instrumentation of physical operations with high sensitivity sensors, tracking events in operations with high frequency and turning sensor data into actionable analytic insights through software and services. However, the physical settings of day-to-day operations (like factories, warehouses, retail stores, and other facilities) are extremely heterogeneous in sensor hardware, networking topology, data protocols, and data formats. This heterogeneity poses high cost overheads on software development, testing, and deployment; code modules need to be redeveloped for each combination of hardware-networking-data protocol-data format. The system provides a method and a software apparatus for managing software and data in this heterogeneous setting.

The software apparatus is optionally designed to be hosted on compute infrastructure comprising of, for example, medium servers (e.g., a dual-core processor and 4 gigabytes of memory) to miniaturized servers (e.g., a single core processor core with less than 1 gigabyte of memory) collocated in the sensor networks. The method described below abstracts the heterogeneity in the sensor network through layers of digital interfaces between the sensors and applications hosted on the software apparatus:

1. Brokers (e.g., brokers 520 in FIG. 5): When the sensors are connected, a connected session occurs and then respective client will then publish and subscribe to topic names. This is a multiprotocol broker optimized to read massive ingest of data. The brokers have built in security to protect the access with security credentials. The brokers have configuration file with specific user's login and password. Also the broker has built in policies to access topics. The system is generic enough to apply these for both built-in and seeded protocol brokers such as MQTT, CoAP, AMQP, or DNP3 but also custom protocols. The plug-in architecture of the protocol broker makes it very easy to develop brokers for custom protocols. Internally the brokers are highly performant and use zero-copy buffering for very fast processing. The broker layer is a lightweight high availability implementation to avoid any single point of failure. It has a dynamic computation domain-specific language (DSL)-based directed acyclic graph (DAG) making it flexible and intuitive. Message may not arrive in timestamp order, so it is hard to know when to close the time window for calculation. Broker can support this model by tracking the low watermark of application clock.

2. Stream processing graphs: The system uses directed acyclic graph (DAG) which is a "stream processing graph," to describe the producer-consumer relationship among processing units associated with the streams. There are source nodes, sink nodes and processing nodes in the graph, where directed edges represent the information flow between various nodes. The source nodes correspond to the source of the input data streams. These nodes only have edges going out, and do not have any edges between them. The sink nodes correspond to the receivers of the eventual processed information. These nodes only have edges going to them, and do not have any edges in between. Processing nodes stand for processing units. A processing unit may require inputs from multiple data streams simultaneously and produce one or many valuable output streams. Such a graph can be plotted in a way such that all the directed edges are pointing downward. The system is designed as information coming from the top and passing through the processing units in the middle and eventually leading to the output streams at the bottom.

3. Queuing System: The relationship between latency and throughput across different levels is very complicated as defined by Little's law. We look at each system as a whole and they include many subsystems, and there will be complex dependencies between them. Each subsystem will bind to the rest of the system, either by throughput or by latency.

When designing a system, it is useful to consider these interactions and then to create a system that will not bottleneck the larger system. The problem of flow control arises in asynchronous communication if the sensors send messages at a higher pace than (one of the) receivers can process them.

The system developed has done many experiments dealing with backpressure issues in a high volume asynchronous system and as result created a robust reactive stream processing and queuing mechanism. The main driver behind starting these reactive streams initiative is to transport data losslessly across an asynchronous boundary in-memory without requiring unbounded buffers. Continuation-passing style (e.g., actor model) is being used. When downstream demand reaches zero stream actors will simply not pull more from their own upstream, and since they are message-driven they will simply not be scheduled until more demand arrives from the very downstream. No threads are blocked for this and no call stacks preserved, but the actor remembers where it was in the stream. This design facilitates a new way of thinking non-determinism in message processing.

4. Edge Mixers: Each sensor posts on their own topic. The interval at which the measures are posted, depends on the sensor. Finally the normalization is needed for mixing the sensors. Sensor measures are posted to time based channels. The measures are posted to these queues in a circular way. Some or all sensors measures can be stitched on a time dimension. A sensor mixer of the system performs one or more of the following sensor time series normalization:

4.1. Normalization into an interval.
4.2. Normalization to sum 1.
4.3. Normalization to Euclidean norm 1.
4.4. Normalization to zero mean.
4.5. Normalization to zero mean and unit standard deviation.

5. Sensor Expression Language: The applications define the pipeline workflow in the edge mixers through a language referred to as a sensor expression language. This language defines the application-side abstraction of data management and analytics, thus controlling the end-to-end method for abstracting the sensor heterogeneity. A specific implementation of a sensor expression language is called Vel® and described in U.S. patent applications 62/312,106, 62/312,187, 62/312,223, and 62/312,255, filed Mar. 23, 2016, are incorporated by reference. Vel is a trademark of FogHorn Systems, Inc.

Intelligent Container Creation and Management Based on Edge and Device Type

Container technology virtualizes computer server resources like memory, CPU, and storage that are managed operating system (OS) with negligible overhead without requiring replication of the entire OS kernel for each tenant (and hence unlike a hypervisor technology). Containers were developed as a part of the popular Linux open-source operating system and have gained significant traction in software development and datacenter operations ("DevOps") with the availability of advanced administration frameworks like Docker and CoreOS. There is growing demand to consume software and analytics for processing sensor data over nearline compute infrastructure very close to physical sensor networks in the Internet of Things (IoT) use-cases (that include physical locations like factories, warehouses, retail stores, and other facilities). These compute nodes include, for example, servers from medium-size (e.g., a dual-core processor and 4 gigabytes of memory) to miniaturized (e.g., a single core processor core with less than 1 gigabyte of memory) are connected to the Internet and have access to a variety of heterogeneous sensor devices and control systems deployed in operations. The system provides methods for deploying and managing container technologies intelligently in these edge compute infrastructure settings.

The following constituent elements describe a method for managing containers in edge infrastructure settings and are implemented in the form of a software apparatus:

1. Centralized administration: The system manages software applications in its Industrial AppStore for IoT™ and all deployment decisions are controlled and managed in this centralized setting. AppStore for IoT is a trademark of FogHorn Systems, Inc.

2. Deployment topology template: The system has a template for each software application module, which is self-contained with all necessary topological details and execution libraries for deployment on the edge infrastructure. This includes composition of needed network protocol, message protocol and data format parser libraries into a service-chain that the application can use to access data from systems in the sensor network. The service composition is performed in an intelligent and automated manner using the knowledge of the system configurations in the destination edge infrastructure.

3. Mobility of application container: The system serializes the deployment template objects containing the configured applications and streams them over the Internet to reach agents in the software apparatus' at the edge infrastructure.

4. Zero-touch deployment at the Edge: The system's software apparatus at the edge is capable of interpreting the configured container object received from the Industrial AppStore for IoT, and deploying it with all the analytics and data management services implemented in the platform. While there might be some manual effort in the configuration, the deployment process is completely automated with no manual intervention.

5. Monitoring of application containers: The system deploys a micro-service based architecture in the software platform (apparatus) at the edge that implements a telemetry agent in each container. This agent measures and reports detailed metrics on the performance and availability of the application in the container. The platform is also capable of raising alarms in case any of these metrics behave anomalously.

6. Responsive migration of containers: The system provides methods to trigger migration of containers from the edge platform back to the cloud in case the telemetric agents observe resource contention and service degradation. This responsive migration will free up resources in the constrained edge infrastructure and expected to enhance the overall service quality of the applications hosted. The priority of the applications also serves as a guiding criterion in scheduling such migrations.

Method for Automated Model-Parallel Machine Learning for Very Large Sensor Networks, and Apparatus for Data-Parallel Transfer Learning Between Sensor Networks and Datacenters Machine learning has evolved as a key computation construct in automating discovery of patterns in data and using the models built to make intelligent predictions in a variety of industrial verticals. Applications of machine learning on sensor data are relevant for data-driven business and operational planning use-cases in the overall Internet of Things (IoT) market segments. However, sensor data pose several challenges to the scalability and efficiency of machine learning workflows:

1. Volume of streaming data: Control systems and machines deployed in operations generate very large volumes of continuously streamed data that poses cost and logistic limitations on aggregation for machine learning analysis 2. Data quality and complexity: Data from industrial systems have very little structure and metadata associated with rampant data corruptions and missing values. The features that constitute the data generated vary widely between different instances of similar operational systems. This severely reduces the fidelity of models developed through traditional machine learning analyses.

3. Gap in data preprocessing: There is lack of compute infrastructure to preprocess data nearer to their sources in an intelligent and efficient manner.

4. Geographic distribution: Industrial operations in IoT scenarios involve systems deployed in large geographic areas that impose cost, bandwidth and latency restrictions on any distribution of compute and data.

The system provides a software apparatus in the form of a platform designed to perform machine-learning workflows across datacenters or "cloud" and compute resources available near sensor networks or "edge", for example, from medium-sized servers (e.g., a dual-core processor and 4 gigabytes of memory) to miniaturized nodes (e.g., a single core processor core with less than 1 gigabyte of memory). The method of the system can include the following components:

1. Stream data processing and in-network aggregation at the edge for preprocessing continuous streams of raw data that can be feed into machine learning analyses—the processing methodology is programmable through APIs by the developers constructing the machine learning analysis.

2. Sensor data query processing for models constructed by the machine learning workflow to execute on preprocessed data at the edge and emit results of execution to the cloud for model valuation.

3. Sensor data segmentation at the edge for partitioning raw data based on their constituent feature sets and intelligent matching with models built by machine learning workflows.

4. Real-time model training and selection in the software platform at the edge based on the above workflow of preprocessing, query based model execution and feature based data segmentation.

The above method including the three components constitutes a system construct of machine learning as a service. A specific implementation by FogHorn Systems is known as FogHorn Cortex.

1. The system's software apparatus coordinates model execution across instances of edge infrastructure (across wide geographies). These models are executed on data across segments of different feature spaces. The apparatus transfers the knowledge learnt across feature spaces by using the cloud as a platform for transferred learning. This brings a lot of efficiency in the machine learning process by avoiding data-labeling and leveraging data with heterogeneous labels.

A use case of an edge computing platform system is factory yield optimization. For example, a modern manufacturing plant wants to maximize yield by early detection of potential defects to allow corrections before irreversible stages in the assembly line. Some benefits of using the edge computing platform system include: Applying a combination of FogHorn's real-time data processing, VEL expression engine and integration with Apache Hadoop for big data analysis, the manufacture expects to reduce scrap by at least 50 percent.

Some solutions include:

1. Hundreds of MQTT and OPC-UA data values from equipment controllers and RFID data for individual parts are collected and transformed in real time at the edge.

2. VEL expressions are used to normalize and aggregate measurements and compare them to a specification.

3. Raw and augmented data transferred to Hadoop where data scientists can build models to characterize sequences of measurements that can lead to defect detection.

4. VEL expressions used to send alerts to technicians to reject or rework products before irreversible steps such as heating, drying, and painting.

Real-time analysis and intelligence includes: Collect and transform measurements and identfiers or IDs. Compute and aggregate measurements with VEL. Historical analysis includes: Identify predictive features. Build and test sequence mining models for scraps.

A use case of an edge computing platform system is locomotive fuel efficiency. For example, a transportation company needs a customizable solution to proactively monitor and optimize train and crew performance in order to reduce fuel consumption. Some benefits of using the edge computing platform system include: Save thousands of gallons of fuel for every engine by detecting excessive idle and inefficient throttle positions base on real-time engine and geolocation data. Reduce mobile network cost by triggering video upload only on abnormal situations.

Some solutions includes:

1. Sensor and GPS data ingested from on-board hardened data collection systems.

2. VEL expressions are used to determine conditions in idling and throttle modulation base on location, speed, time, and other parameters.

3. Send alerts to command centers where operators can take proactive actions to reduce fuel consumption while maintaining optimal train handling.

4. Real-time applications used to detect unsafe conditions and trigger upload of video streams to data center for analysis.

Real-time analysis and intelligence includes: Data aggregation. Rules and alers. Trigger data transfers. Historical analysis includes: Rules and predictive models for train operation, safety, and fuel consumption.

A use case of an edge computing platform system is pump cavitation alerts. For example, an equipment maker requires a solution to detect cavitation events that can cause damage to its pumps and control valve products installed in factories and power plants. Some benefits of using the edge computing platform system include: Improve equipment lifespan by taking corrective actions when cavitation occurs. Avoid unplanned downtime and catastrophic failures with predictive maintenance.

Some solutions includes:

1. Measurements such as inlet and outlet pressure, flow, and temperature are collected from multiple sensors attached to the equipment.

2. VEL expressions are used to calculate vapor differentials in real time to detect cavitation formation.

3. Alerts are sent to technicians to increase fluid pressure or flow, or decrease temperature to avoid damage to the seal, bearing, and impeller.

4. Analyze historical information to identify patterns to enable technicians to detect cavitation or schedule maintenance before failure.

Real-time analysis and intelligence includes: Collect and transform measurements in real time. VEL to calculate vapor differentials leading to cavitation. Historical analysis includes: Analyze time-series measurements to identify patterns for cavitation events.

A use case of an edge computing platform system is wind energy forecasting. For example, a renewable energy company requires to accurately predict, report, and meet power generation over next 24 hours, as per government mandate. Some benefits of using the edge computing platform system include: Ability to generate alerts at least 90 minutes ahead of time for turbines that cannot meet 24 hours energy generation forecast and apply it to either optimize turbine settings or revise forecast.

Some solutions include:

1. Six month or more of historical and real-time data collected from SCADA controller system on each turbine, augmented with weather, atmosphere and terrain data.

2. Train models based on 20 or more attributes to predict power generation over 15 minute intervals.

3. Apply models at the edge to produce real-time scores on power generation. VEL expressions are used to compare performance against forecast to generate alerts.

4. Enable technicians to either fine tune turbine settings or revise forecast.

Real-time analysis and intelligence includes: Collect and transform data. Score and update models. Identify conditions with VEL. Historical analysis includes: Statistical analysis. Extract features. Build and test models.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
receiving a first sensor data stream from a first virtual sensor of a local network at an edge computing platform coupled between the first virtual sensor and a remote network, wherein the first virtual sensor is specified using an expression language of the edge computing platform, the first virtual sensor operates on a second sensor data stream according to a first function and produces the first sensor data stream, and the first sensor data stream comprises data about a condition being monitored;
producing on the edge computing platform a first stream data corresponding to the first sensor data stream;
processing the first stream data at an analytics engine of the edge computing platform in real time without first transferring the first sensor data stream to the remote network, wherein the processing comprises
executing on the first stream data a model generated by machine learning, the model being operable to intelligently identify patterns in data streams and make predictions based thereon, wherein the model is implemented as a set of one or more analytic expressions of the expression language,
identifying in the first stream data the presence of a pattern comprising an indication about the condition,
generating intelligence information about the condition, and
predicting at least one aspect of the condition from the intelligence information; and
executing an application on the edge computing platform, wherein the application determines whether to transmit at least a portion of the intelligence information to the remote network for additional processing and whether to take selected action in the local network related to the condition based on the prediction without awaiting the additional processing.

2. The method of claim 1 comprising:
generating the model by
at the edge computing platform, processing a second sensor data stream comprising data about a condition being monitored by the first virtual sensor of the local network over a period of time and aggregating a first quantity of intelligence information about the condition,
conducting a machine learning analysis on the first quantity of intelligence information and generating a first model designed to predict at least one aspect of the condition based on intelligence information,
at the edge computing platform, processing a third sensor data stream comprising data about the condition over a period of time and aggregating a second quantity of intelligence information about the condition,
applying the first model to the second quantity of intelligence information and predicting the at least one aspect of the condition based on the intelligence information, and
evaluating the accuracy of the prediction;
implementing the first model as a set of analytics expressions of the expression language; and
incorporating the set of analytics expressions implementing the first model into the analytics engine of the edge computing platform as the model.

3. The method of claim 1 wherein the first virtual sensor receives the second sensor data stream from a first physical sensor.

4. The method of claim 1 wherein the first virtual sensor operates on the second sensor data stream and a third sensor data stream according to a first function and produces the first sensor data stream.

5. The method of claim 4 wherein the first virtual sensor receives the second sensor data stream from a first physical sensor and the third sensor data stream from a second physical sensor.

6. The method of claim 4 wherein the first virtual sensor receives the second sensor data stream from a first physical sensor and the third sensor data stream from a second virtual sensor.

7. The method of claim 4 comprising:
enriching the first stream data in the edge platform system by performing an enrichment action on the first stream data, wherein the enrichment action comprises decoding the first stream data.

8. The method of claim 4 comprising:
enriching the first stream data in the edge platform system by performing an enrichment action on the first stream data, wherein the enrichment action comprises supplementing the first stream data with metadata.

9. The method of claim 4 comprising:
enriching the first stream data in the edge platform system by performing an enrichment action on the first stream data, wherein the enrichment action comprises normalizing the first stream data.

10. The method of claim 7 comprising:
  processing the enriched first stream data at the analytics engine of the edge platform system, wherein the processing comprises applying to the enriched first stream data a second function specified in the expression language.

11. The method of claim 10 wherein the second function comprises a transform.

12. The method of claim 10 wherein the second function comprises a pattern detection.

13. The method of claim 10 wherein the second function comprises a dynamic calibration.

14. The method of claim 10 wherein the second function comprises a signal processing.

15. The method of claim 10 wherein the second function comprises a math expression.

16. The method of claim 10 wherein the second function comprises a data compaction.

17. The method of claim 10 wherein the second function comprises a data analytic.

18. The method of claim 10 wherein the second function comprises a data aggregation.

19. The method of claim 10 wherein the second function comprises a rule application.

20. The method of claim 10 wherein the second function comprises an alert.

21. The method of claim 10 wherein the second function comprises a service invocation.

22. The method of claim 1 wherein the edge computing platform is embedded in a network device of the local network.

23. The method of claim 1 wherein the edge computing platform comprises a gateway of the local network.

24. The method of claim 1 wherein the selected action comprises generating an alert.

25. The method of claim 1 wherein the selected action comprises altering an operation in the local network.

26. The method of claim 1 wherein the edge computing platform is coupled to the local network by a first network connection of a first type and is coupled to the remote network by a second network connection of a second type, the second type is different from the first type, and the second type comprises a lower bandwidth connection.

27. The method of claim 1 wherein the first sensor data stream is produced by the first virtual sensor in real time.

28. The method of claim 1 comprising:
  providing a software development kit that allows a user to develop applications executable on the edge platform system; and
  by way of the software development kit, developing a first containerized application that can access and process the intelligence information.

29. The method of claim 28 comprising:
  providing an application store of the edge platform system, wherein the first containerized application is available for users to access through the application store.

30. The method of claim 1 wherein the first function comprises a transform.

31. The method of claim 1 wherein the first function comprises a pattern detection.

32. The method of claim 1 wherein the first function comprises a dynamic calibration.

33. The method of claim 1 wherein the first function comprises a signal processing.

34. The method of claim 1 wherein the first function comprises a math expression.

35. The method of claim 1 wherein the first function comprises a data compaction.

36. The method of claim 1 wherein the first function comprises a data analytic.

37. The method of claim 1 wherein the first function comprises a data aggregation.

38. The method of claim 1 wherein the first function comprises a rule application.

39. The method of claim 1 wherein the first function comprises an alert.

40. The method of claim 1 wherein the first function comprises a service invocation.

* * * * *